US009177151B2

(12) United States Patent
 Saito

(10) Patent No.: US 9,177,151 B2
(45) Date of Patent: Nov. 3, 2015

(54) OPERATING SPEED CONTROL OF A PROCESSOR AT THE TIME OF AUTHENTICATION BEFORE AN OPERATING SYSTEM IS STARTED

(71) Applicant: KABUSHIKI KAISHA TOSHIBA, Minato-ku, Tokyo (JP)

(72) Inventor: Toshimitsu Saito, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 290 days.

(21) Appl. No.: 13/777,652

(22) Filed: Feb. 26, 2013

(65) Prior Publication Data
 US 2014/0006765 A1 Jan. 2, 2014

(30) Foreign Application Priority Data

Jun. 27, 2012 (JP) ................... 2012-144516

(51) Int. Cl.
 *G06F 21/57* (2013.01)
(52) U.S. Cl.
 CPC ...... *G06F 21/572* (2013.01); *G06F 2221/2135* (2013.01)
(58) Field of Classification Search
 CPC .................................................. G06F 9/4401
 USPC ........................................................... 713/2
 See application file for complete search history.

(56) References Cited

U.S. PATENT DOCUMENTS

| 5,220,671 | A | 6/1993 | Yamagishi |
| 7,124,300 | B1 * | 10/2006 | Lemke ........................... 713/186 |
| 7,626,582 | B1 * | 12/2009 | Nicolas et al. ................. 345/204 |
| 8,010,798 | B1 * | 8/2011 | Lemke ........................... 713/186 |
| 8,458,772 | B2 * | 6/2013 | Uchikawa ........................ 726/4 |
| 2002/0091946 | A1 | 7/2002 | Satoh |
| 2007/0124588 | A1 | 5/2007 | Tsuji et al. |

FOREIGN PATENT DOCUMENTS

| JP | 04-160422 | 6/1992 |
| JP | 04-227519 | 8/1992 |
| JP | 2002-073497 A | 3/2002 |

(Continued)

OTHER PUBLICATIONS

IBM, Actively Slowing a CPU in Response to the Detection of a Signature String, May 1, 1994, IBM Technical Disclosure Bulletin, vol. 37, Issue 5, pp. 419-422.*

(Continued)

*Primary Examiner* — Suresh Suryawanshi
(74) *Attorney, Agent, or Firm* — Knobbe, Martens, Olson & Bear LLP

(57) ABSTRACT

According to one embodiment, non-volatile storage device stores a program for causing a processor to execute processing of determining whether registered authentication information exists in the information processing apparatus, authentication processing determining whether input authentication information matches the registered authentication information, and processing of booting an operating system. The operating speed control module decreases an operating speed of the processor in response to the determination that the registered authentication information exists in the apparatus, and increases the operating speed of the processor in response to the confirmation of the match between the input authentication information and the registered authentication information.

15 Claims, 6 Drawing Sheets

(56) References Cited

FOREIGN PATENT DOCUMENTS

| | | |
|---|---|---|
| JP | 2002-183090 | 6/2002 |
| JP | 2004-005105 A | 1/2004 |
| JP | 2007-148979 | 6/2007 |
| JP | 2010-191648 A | 9/2010 |

OTHER PUBLICATIONS

First Office Action for corresponding Japanese Application No. 2012-144516, mailed Jul. 23, 2013, 5 pages.

* cited by examiner

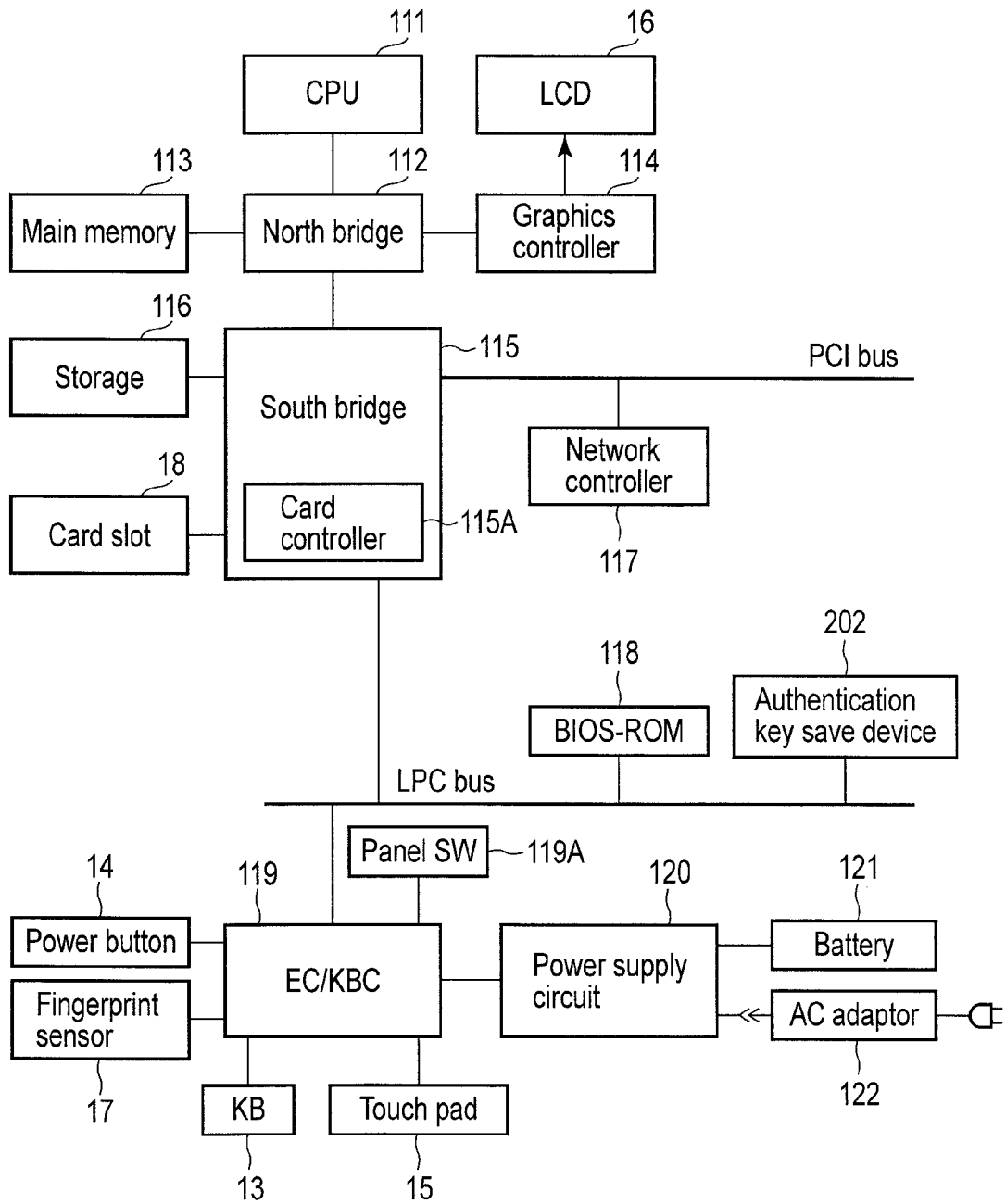
F I G. 2

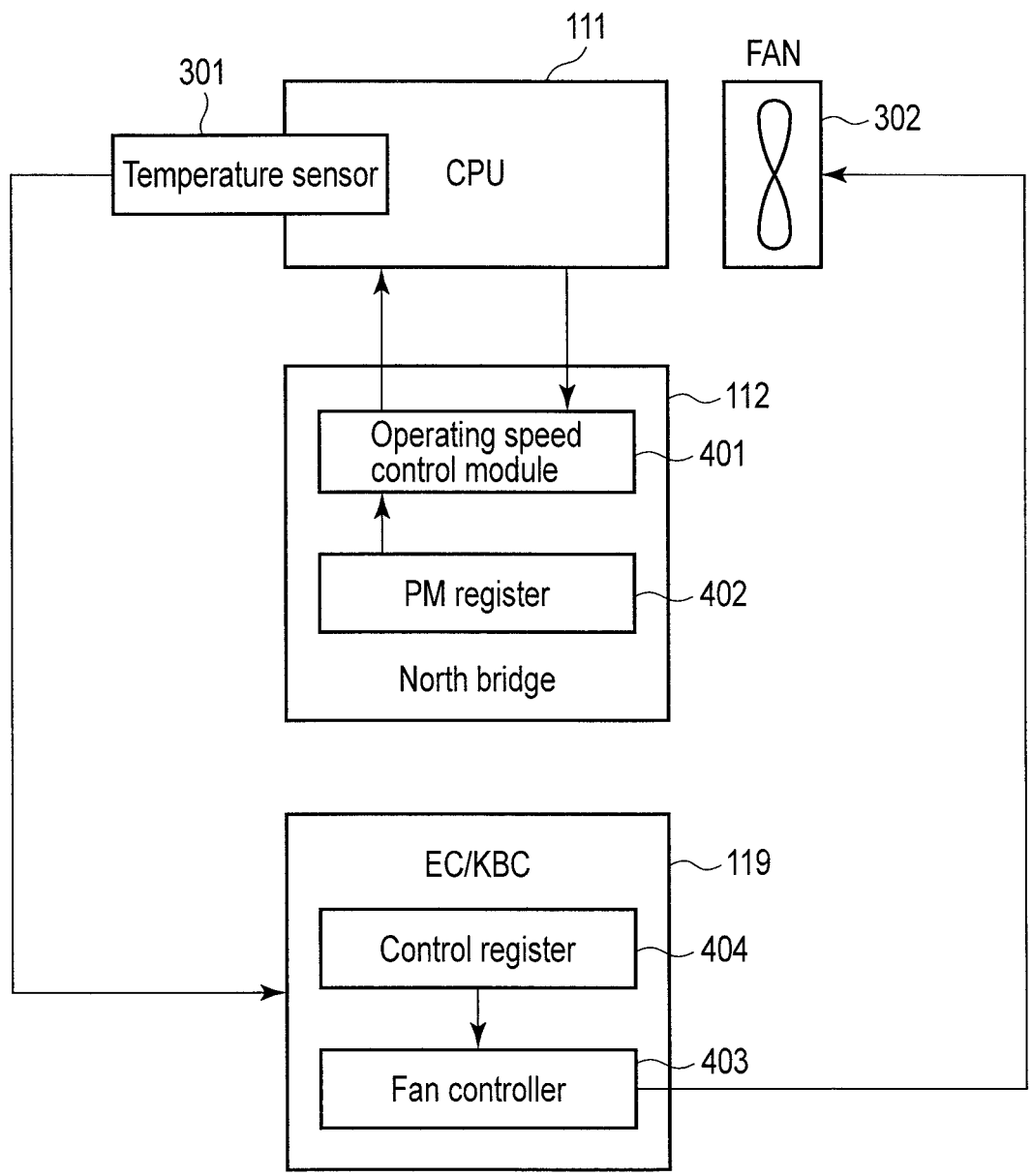
F I G. 3

OPERATING SPEED CONTROL OF A PROCESSOR AT THE TIME OF AUTHENTICATION BEFORE AN OPERATING SYSTEM IS STARTED

CROSS-REFERENCE TO RELATED APPLICATIONS

This application is based upon and claims the benefit of priority from Japanese Patent Application No. 2012-144516, filed Jun. 27, 2012, the entire contents of which are incorporated herein by reference.

FIELD

Embodiments described herein relate generally to an information processing apparatus capable of performing user authentication upon power-on, and a start-up control method applied to the apparatus.

BACKGROUND

In recent years, various portable personal computers of a notebook type or laptop type have been developed. Portable personal computers need to minimize the time taken to start up in order to enhance user friendliness.

Since portable personal computers may be carried to various places, they require a high security function to prevent leakage of information in the computers.

As one security function, there is known a basic input/output system (BIOS) password processing function. The BIOS password processing function is a function of executing user authentication processing by a BIOS (BIOS program) to confirm the authenticity of a user upon power-on of a computer. All operations including boot processing of an operating system are inhibited unless a BIOS password registered in advance in a computer and a password typed by a user match each other. Even if a computer is stolen, it can be protected from unauthorized use by using the BIOS password processing function.

Recently, a function of automatically turning on a computer when its display panel is opened has also been developed for higher user friendliness. This function can turn on a computer simultaneously when the user takes it out from his bag and opens the display panel.

However, if the computer in the bag is erroneously turned on without the user's knowing it, it may remain at the stage of BIOS password processing for a long time.

In another case, a malicious person may turn on the computer of another person for the purpose of unauthorized use. Since the malicious person does not know a correct password, the computer may remain at the stage of BIOS password processing for a long time even in this case.

Many operating systems have a thermal control function. However, while the computer remains at the stage of BIOS password processing, the thermal control function of the operating system does not operate. This is because the operating system has not been booted.

Hence, if the computer remains at the stage of BIOS password processing for a long time, the amount of heat generated by several devices in the computer increases, and the temperature of the computer may excessively rise. While the computer remains at the stage of BIOS password processing, large power may be consumed wastefully. If the computer is driven by power from a battery, the remaining capacity of the battery decreases.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary block diagram showing a system configuration of the information processing apparatus according to the embodiment;

FIG. 3 is an exemplary block diagram showing an example of the arrangement of hardware for controlling the performance of the information processing apparatus according to the embodiment;

DETAILED DESCRIPTION

Various embodiments will be described hereinafter with reference to the accompanying drawings.

In general, according to one embodiment, an information processing apparatus includes a processor, non-volatile storage device, and operating speed control module. The non-volatile storage device stores a program for causing the processor to execute processing of, in response to power-on of the information processing apparatus, determining whether registered authentication information exists in the information processing apparatus, authentication processing of, when the registered authentication information exists in the information processing apparatus, comparing input authentication information with the registered authentication information and determining whether the input authentication information matches the registered authentication information, and processing of booting an operating system in response to confirmation of a match between the input authentication information and the registered authentication information by the authentication processing. The operating speed control module decreases an operating speed of the processor in response to the determination that the registered authentication information exists in the information processing apparatus, and increases the operating speed of the processor in response to the confirmation of the match between the input authentication information and the registered authentication information by the authentication processing.

Figure 1:
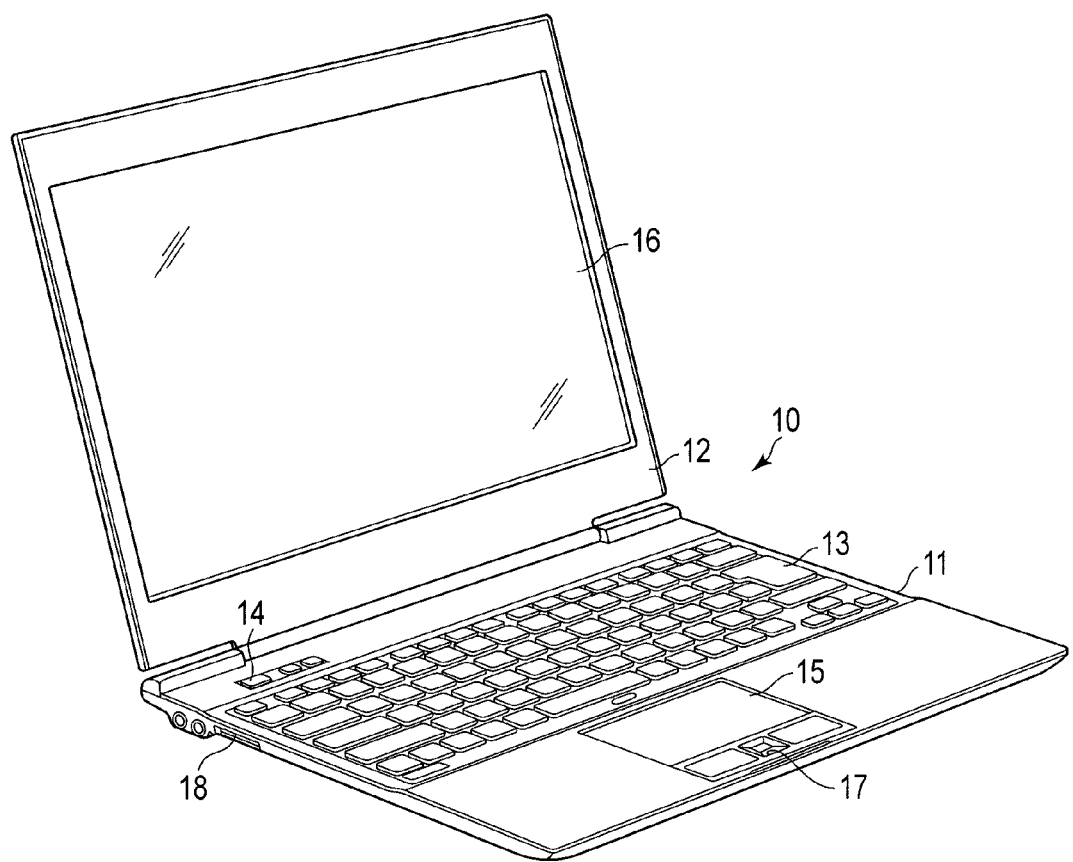
FIG. 1 is an exemplary perspective view showing the outer appearance of an information processing apparatus according to an embodiment.

FIG. 1 is a perspective view showing the outer appearance of an information processing apparatus according to an embodiment. The information processing apparatus is implemented as, e.g., a notebook type personal computer (PC) 10. The information processing apparatus may be implemented as a tablet computer, PDA, or the like.

As shown in FIG. 1, the computer 10 includes a computer main body 11 and display unit 12. A display formed from an LCD (Liquid Crystal Display) 16 is assembled into the display unit 12.

The display unit 12 is attached to the computer main body 11 rotatable between an opened position at which the top surface of the computer main body 11 is exposed, and closed position at which the top surface of the computer main body 11 is covered with the display unit 12. The computer main body 11 includes a thin box-like housing. A keyboard 13, a power button 14 for turning on/off the computer 10, and a touch pad 15 functioning as a pointing device are arranged on the upper surface of the computer main body 11. Another type of information processing apparatus may include a mouse, touch panel, and the like as pointing devices. Further, a fingerprint sensor 17 is arranged on the upper surface of the computer main body 11. The fingerprint sensor 17 is a sensor device configured to detect the fingerprint of a user, and is used to execute fingerprint authentication processing.

The computer main body 11 includes a card slot 18. A card device such as an SD card can be removably inserted into the card slot 18. The card slot 18 may be formed in the side surface of the computer main body 11.

FIG. 2 shows the system arrangement of the computer 10.

The computer 10 includes a central processing unit (CPU) 111, north bridge 112, main memory 113, graphics controller 114, south bridge 115, storage device 116, network controller 117, BIOS-ROM 118, embedded controller/keyboard controller IC (EC/KBC) 119, power supply circuit 120, and authentication key storage device 202.

The CPU 111 is a processor which controls the operation of each component in the computer 10. The CPU 111 executes various software programs which are loaded from the storage device 116 into the main memory 113. The software programs include an operating system, various application programs, and various utility programs. Further, the CPU 111 executes a basic input/output system (BIOS) stored in the BIOS-ROM 118. The BIOS is a program for executing start-up processing for starting up the computer 10, and the like. When the computer 10 is turned on, the CPU 111 executes the BIOS first.

In response to power-on of the computer 10, the BIOS causes the CPU 111 to execute processing of determining whether registered authentication information exists in the computer 10. The registered authentication information is authentication information registered by a user operation.

As the authentication information, a password (BIOS password), token, or fingerprint information is usable. The user can register a BIOS password in the computer 10 by selecting a BIOS password registration item on a BIOS setup screen, and typing a password to be registered. By using an authentication utility program, the user can create a token on a portable device, and register it in the computer 10. As the portable device, a card device such as an SD card, or a USB device is available. Also, the user can register fingerprint information in the computer 10, by starting the fingerprint registration function of the authentication utility program and using the fingerprint sensor 17 to read his fingerprint.

When registered authentication information exists in the computer 10, that is, a BIOS password, token, or fingerprint information is registered in the computer 10, the BIOS causes the CPU 111 to execute authentication processing of comparing input authentication information with the registered authentication information and determining whether the input authentication information matches the registered authentication information. When a BIOS password is registered in the computer 10, a password (input BIOS password) typed by an operation of the keyboard 13 carried out by the user is compared with the registered BIOS password. When a token is registered in the computer 10, a token is read from a portable device connected to the computer 10, and the read token (input token) is compared with the registered token. When fingerprint information is registered in the computer 10, fingerprint information (input fingerprint information) detected by the fingerprint sensor 17 is compared with the registered fingerprint information.

In authentication processing, the BIOS repetitively executes password input processing for receiving input authentication information (BIOS password, token, or fingerprint information) until the input authentication information is received. The password input processing executes, for example, processing of receiving a key input from the EC/KBC 119, processing of performing read access to a portable device such as an SD card, or processing of receiving fingerprint information from the fingerprint sensor 17. In authentication processing, processing of comparing input authentication information with registered authentication information may be repetitively executed until a match between them is detected.

If a match between input authentication information and registered authentication information is confirmed by authentication processing, the BIOS calls a boot processing routine in it, and causes the CPU 111 to execute processing of booting an operating system.

Note that when no registered authentication information exists in the computer 10, the above-described authentication processing is skipped. In this case, processing of booting an operating system is executed without performing the authentication processing.

As described above, if the computer 10 is erroneously turned on in a bag without the user's knowing it, or a malicious person turns on the computer 10, the computer 10 may remain at the stage of the authentication processing for a long time. In this case, the above-described password input processing is repetitively executed, or the above-described comparison processing is repetitively executed. As a result, the amount of heat generated by a heat-generating device such as the CPU 111 may increase, and the temperature of the computer may excessively rise.

In the embodiment, to suppress heat generation during a period before the operating system is booted, a system performance control routine is added to the BIOS. The system performance control routine includes a routine to decrease the system performance of the computer 10 prior to the start of authentication processing, and a routine to increase the system performance and return it to high original system performance in response to confirmation of a match between input authentication information and registered authentication information by authentication processing.

Accordingly, the computer 10 can operate at low system performance during authentication processing regardless of whether authentication information is input or not. Even if the computer 10 remains at the stage of the above-described authentication processing for a long time in wait for input of authentication information or the like, heat generation and wasteful power consumption of the computer 10 can be suppressed.

System performance necessary to execute the above-mentioned authentication processing is much lower than system performance necessary for an operating system or application program to run. Thus, executing authentication processing at low system performance hardly prolongs the time taken for authentication processing.

By adding the system performance control routine to the BIOS, heat generation and wasteful power consumption of the computer 10 can be efficiently suppressed without prolonging the time taken to start up the computer 10.

As a method of controlling the system performance, a method of controlling the operating speed of the CPU 111 can be adopted. In this case, the BIOS decreases the operating speed of the CPU 111 during authentication processing, and increases it in response to confirmation of a match between input authentication information and registered authentication information by authentication processing.

As the method of controlling the operating speed of the CPU 111, a throttling control method is usable. The throttling control method is a method of intermittently operating the CPU 111 by using a stop clock control signal or the like. By using the throttling control method, the operating frequency of the CPU 111 can be decreased to, e.g., 50%, 25%, or 12% of the maximum frequency of the CPU 111. As the method of controlling the operating speed of the CPU 111, a method of alternately switching the state of the CPU 111 between a state (C0 state) in which instructions are executed and a sleep state (e.g., C1 state or C2 state) in which no instruction is executed is also usable. Further, as the method of controlling the operating speed of the CPU 111, a method of dynamically changing the frequency of the clock signal of the CPU 111 is also available.

In control of the system performance, not only the operating speed of the CPU 111 is controlled, but also the performance of several other devices in the computer 10 may be controlled.

For example, when a BIOS password is used for authentication processing, devices irrelevant to password authentication, other than the EC/KBC 119 necessary for key input and the LCD 16 necessary to display a message prompting the user to enter a key input, may be commanded to enter the power saving state (e.g., D3 state) using a power management register or the like.

When fingerprint information is used for authentication processing, devices irrelevant to fingerprint authentication, other than the fingerprint sensor 17 and the LCD 16 necessary to display a message prompting the user to input fingerprint information, may be commanded to enter the power saving state (e.g., D3 state) using a power management register or the like.

When a token is used for authentication processing, devices irrelevant to token authentication, other than a device (e.g., a card controller 115A) for accessing a portable device and the LCD 16 necessary to display a message prompting the user to input a token, may be commanded to enter the power saving state (e.g., D3 state) using a power management register or the like.

The north bridge 112 shown in FIG. 2 is a bridge device which connects the local bus of the CPU 111 and the south bridge 115. The north bridge 112 has a function of executing communication with the graphics controller 114. The north bridge 112 incorporates a memory controller which controls the main memory 113.

The graphics controller 114 is a display controller which controls the LCD 16 used as the display monitor of the computer 10.

The south bridge 115 is connected to a PCI (Peripheral Component Interconnect) bus and LPC (Low Pin Count) bus. The south bridge 115 includes an ATA controller for accessing the storage device 116. The storage device 116 may be a solid state drive (SSD) or hard disk drive (HDD). The south bridge 115 includes the card controller 115A for controlling a card inserted into the card slot 18.

The BIOS-ROM 118 is a non-volatile storage device which stores the above-described BIOS. The BIOS-ROM 118 may be a flash EEPROM. The embedded controller/keyboard controller IC (EC/KBC) 119 is a one-chip microcomputer on which an embedded controller for power management and a keyboard controller for controlling the keyboard (KB) 13, touch pad 15, and the like are integrated. The EC/KBC 119 turns on/off the computer 10 in accordance with an operation of the power button 14 carried out by the user in cooperation with the power supply circuit 120. The power supply circuit 120 generates operating power to be supplied to each component of the computer 10 by using power from a battery 121 incorporated in the computer main body 11 or power from an AC adaptor 122 serving as an external power supply.

The EC/KBC 119 is connected to a panel switch 119A configured to detect opening/closing of the display unit 12. Even when the panel switch 119A detects opening of the display unit 12, the EC/KBC 119 turns on the computer 10.

The authentication key storage device 202 is a non-volatile storage device configured to store the above-described registered authentication information.

The system arrangement in FIG. 2 is merely an example, and another system arrangement may be used. For example, the CPU 111, north bridge 112, and graphics controller 114 may be implemented by one processor having all these functions. In this case, the CPU 111, memory controller, and graphics controller 114 are incorporated in this processor.

Instead of the south bridge 115, a PCH (Platform Controller Hub) may be used. The PCH may include an interface with a plurality of PCI Express buses, and an interface with a plurality of USB ports. In this case, the network controller 117 may be connected to a PCI Express bus in the plurality of PCI Express buses. Similarly, the card controller 115A may be connected to another PCI Express bus. Further, the fingerprint sensor 17 may be connected to the PCH via a USB port.

FIG. 3 shows an example of the arrangement of hardware for controlling the system performance of the computer 10.

The north bridge 112 includes an operating speed control module 401. The operating speed control module 401 is a hardware module configured to control the operating speed of the CPU 111. The operating speed control module 401 controls the operating speed of the CPU 111 in accordance with a parameter set in a power management (PM) register 402 by the BIOS or the like. More specifically, the operating speed control module 401 decreases the operating speed of the CPU 111 during the above-described authentication processing under the control of the BIOS. In response to confirmation of a match between input authentication information and registered authentication information by the authentication processing, the operating speed control module 401 increases the operating speed of the CPU 111 under the control of the BIOS. The operating speed control module 401 can change the operating speed of the CPU 111 in multiple stages by, for example, changing the frequency of the clock signal of the CPU 111 or performing the aforementioned throttling control to intermittently operate the CPU 111. The amount of heat generated by the CPU 111 can be reduced by decreasing the operating speed of the CPU 111.

The computer 10 further includes, as hardware modules for thermal control of the CPU 111, a temperature sensor 301 configured to detect the temperature of the CPU 111, a cooling fan 302 configured to cool the CPU 111, a fan controller 403 configured to control the rotation of the cooling fan 302, and a control register 404 in which fan control parameters designated by the operating system or BIOS are written. The fan control parameters are parameters which designate the rotation start, rotational speed, rotation stop, and the like of the cooling fan 302.

Figure 4:
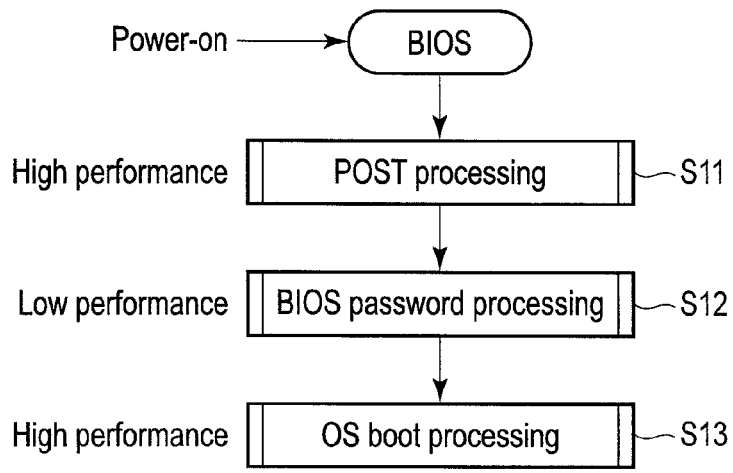
FIG. 4 is an exemplary flowchart showing a start-up processing sequence to be executed by the BIOS of the information processing apparatus according to the embodiment.

A start-up processing sequence to be executed by the BIOS will be explained with reference to the flowchart of FIG. 4.

The BIOS includes a power-on self-test (POST) processing routine, a user authentication processing routine, a boot processing routine, and a hardware control routine for accessing various hardware modules. The user authentication processing routine includes instructions for executing BIOS password processing using the above-mentioned authentication information (BIOS password, token, or fingerprint information) upon power-on of the computer 10. The BIOS password processing is user authentication processing for confirming the authenticity of a user.

At a cold start or the like, the POST processing routine may be executed prior to execution of the BIOS password processing upon power-on of the computer 10. The POST processing routine includes instructions for executing POST processing. The POST processing is processing of detecting each hardware module in the computer 10 and executing initial setting of each hardware module and the like. The boot processing routine includes instructions for executing OS boot processing to boot an operating system.

When the computer 10 is turned on in accordance with an operation of the power button 14 by the user or detection of opening of the display unit 12, power is supplied to each component in the computer 10. The CPU 111 starts operating at, e.g., 100% performance (CPU speed=high). First, the CPU 111 executes the BIOS. The BIOS executes, for example, the following sequence to start up the computer 10.

The BIOS calls the POST processing routine to execute POST processing (step S11). Then, the BIOS calls the user authentication processing routine to execute BIOS password processing (step S12). The BIOS calls the boot processing routine to execute OS boot processing (step S13).

In the embodiment, the system performance control routine is added to the user authentication processing routine for executing BIOS password processing. Hence, the POST processing is executed in a state in which the system performance is set to normal high performance (CPU speed=high). In contrast, the BIOS password processing is executed in a state in which the system performance is set to low performance (CPU speed=low). When exiting from the BIOS password processing, that is, when a match between input authentication information and registered authentication information is confirmed, the system performance returns to high performance. Thus, the OS boot processing is executed in a state in which the system performance is set to high performance (CPU speed=high).

Note that execution of the POST processing may be skipped in return from the hibernation state or the like.

A BIOS password processing sequence including no system performance control routine will be explained with reference to the flowchart of FIG. 5. The following description assumes that a password (BIOS password) is used as authentication information.

In BIOS password processing, the BIOS determines whether a password (BIOS password) has been registered in the computer 10 (step S21). If no password has been registered (NO in step S21), the BIOS advances to step S25 and executes OS boot processing.

If a password has been registered (YES in step S21), the BIOS executes authentication processing to compare an input password with the registered password and determine whether the input password matches the registered password (steps S22 and S23). If the input password matches the registered password (YES in step S23), the BIOS advances to step S25 and executes OS boot processing.

Figure 5:
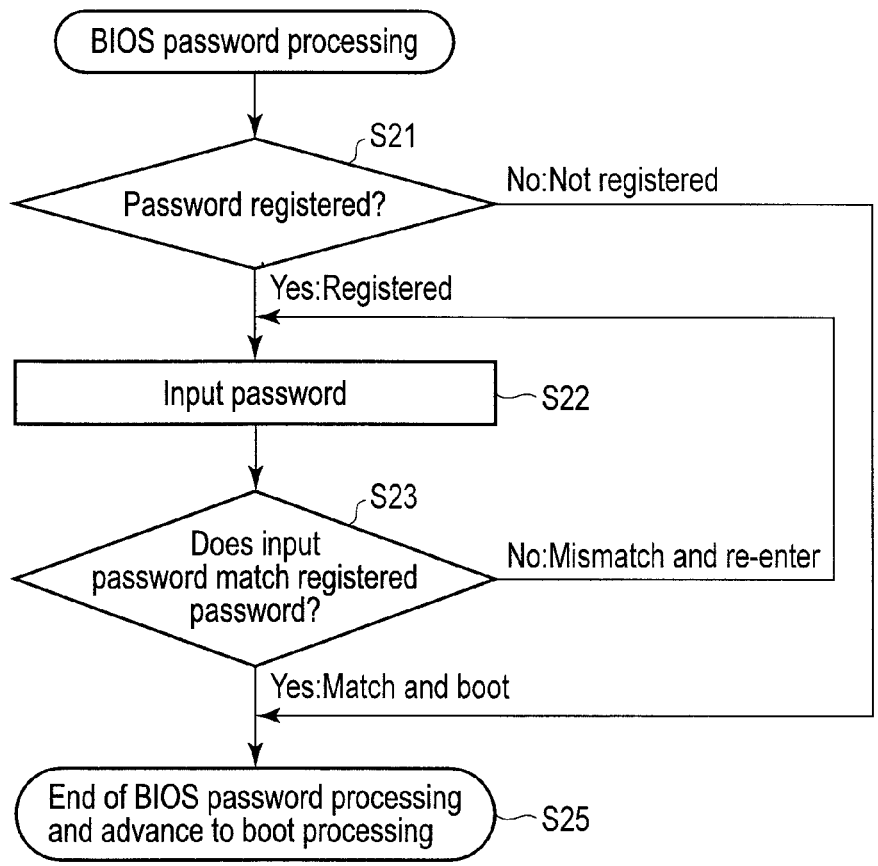
FIG. 5 is an exemplary flowchart showing a BIOS password processing sequence including no performance control processing.

Since no system performance control routine exists in the BIOS password processing of FIG. 5, the operating speed of the CPU 111 is maintained at, e.g., the maximum speed (100% performance) during the BIOS password processing.

A BIOS password processing sequence including the system performance control routine will be explained with reference to the flowchart of FIG. 6.

In BIOS password processing, the BIOS determines whether a password (BIOS password) has been registered in the computer 10 (step S31). If no password has been registered (NO in step S31), the BIOS advances to step S36 and executes OS boot processing.

If a password has been registered (YES in step S31), the BIOS sets the system performance to low performance not to generate heat (step S32). In step S32, the BIOS uses the operating speed control module 401 to execute processing of decreasing the operating speed of the CPU 111. The operating speed of the CPU 111 is decreased from, e.g., the maximum speed (100% performance) to performance such as 50%, 25%, or 12% of the maximum speed. Further, the BIOS can execute processing of setting several devices to the D3 state.

Then, the BIOS executes authentication processing to compare an input password with the registered password and determine whether the input password matches the registered password (steps S33 and S34). In step S33, the BIOS executes processing of displaying, on the LCD 16, a message prompting the user to input a password, and processing of receiving a key input code from the EC/KBC 119.

If the input password matches the registered password (YES in step S34), the BIOS returns the system performance to high performance (step S35). In step S35, the BIOS uses the operating speed control module 401 to execute processing of increasing the operating speed of the CPU 111. The operating speed of the CPU 111 returns to, e.g., the maximum speed (100% performance). The BIOS can also execute processing of returning several devices to the D0 state. After that, the BIOS advances to step S36 and executes OS boot processing.

If the input password does not match the registered password (NO in step S34), the BIOS returns to step S33. The BIOS then executes authentication processing to compare a re-entered password with the registered password and determine whether the re-entered password matches the registered password (steps S33 and S34).

Another BIOS password processing sequence including the system performance control routine will be explained with reference to the flowchart of FIG. 7.

Figure 6:
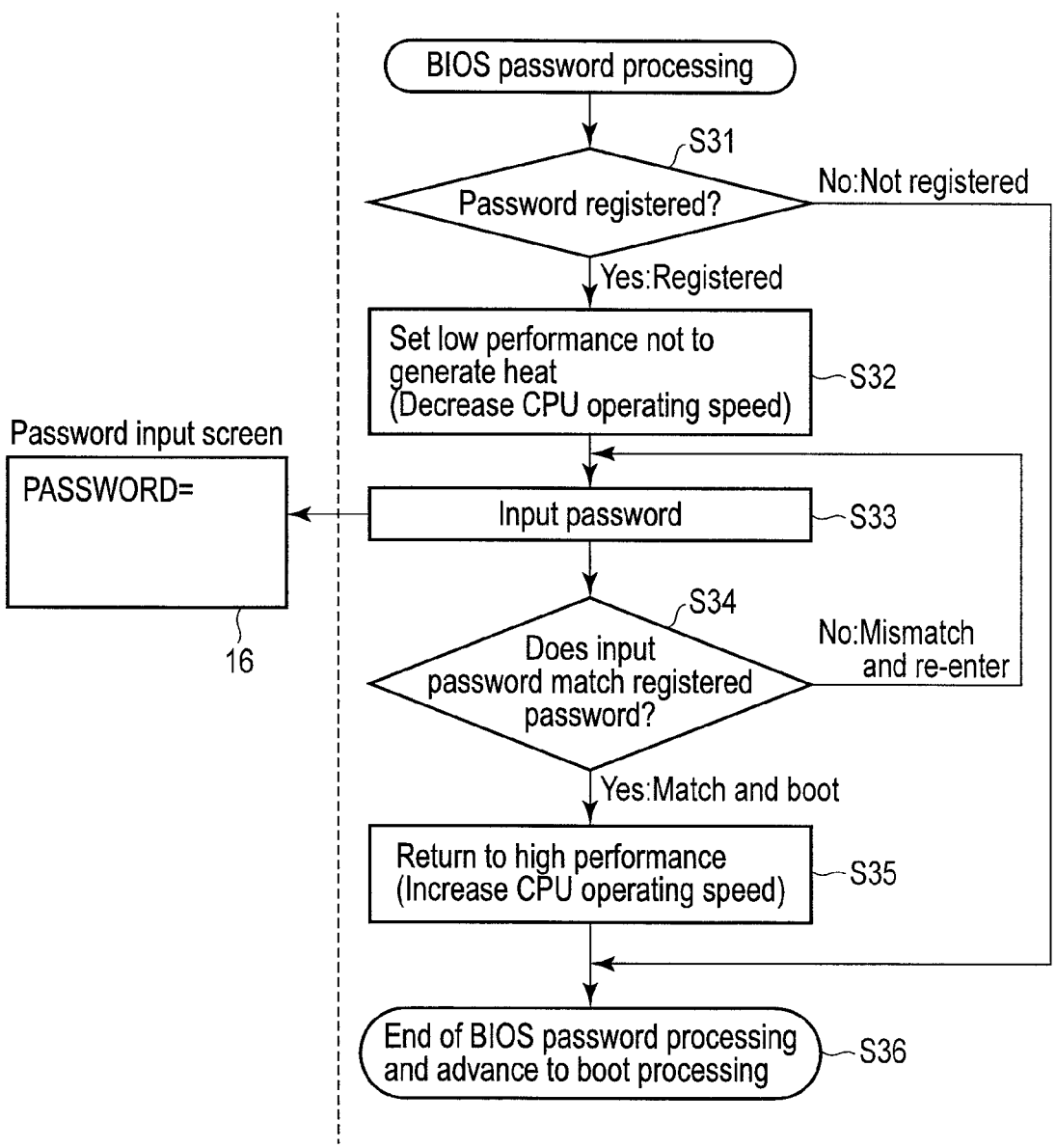
FIG. 6 is an exemplary flowchart showing a BIOS password processing sequence including performance control processing that is executed during start-up processing in FIG. 4.
Figure 7:
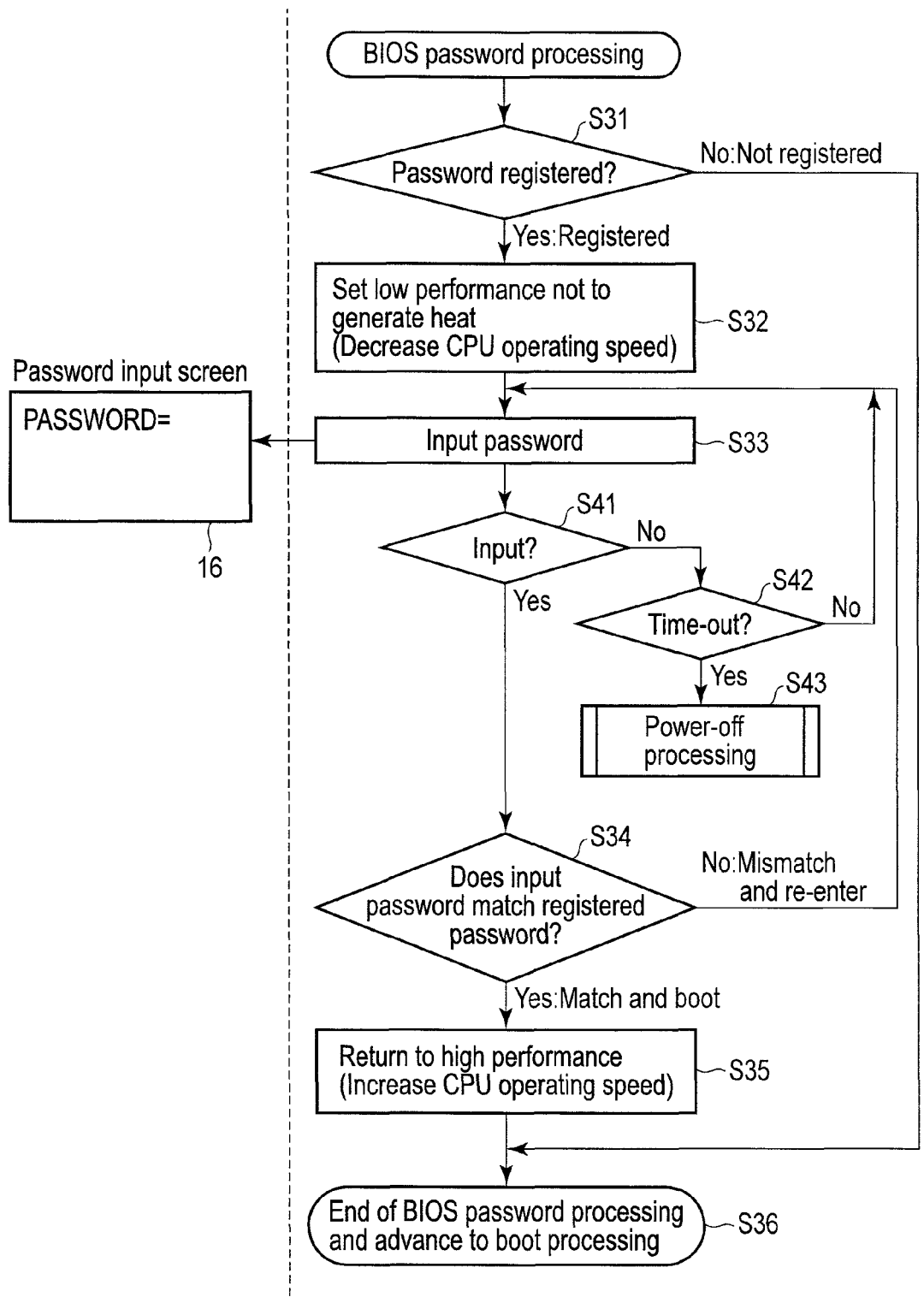
FIG. 7 is an exemplary flowchart showing another BIOS password processing sequence including performance control processing that is executed during start-up processing in FIG. 4.

In the BIOS password processing of FIG. 7, processes in steps S41, S42, and S43 are added to the BIOS password processing of FIG. 6. The processes in steps S41, S42, and S43 are processes for automatically turning off the computer 10 when the time during which no password has been input exceeds the time-out period.

The BIOS determines whether a password has been input (step S41). If no password has been input (NO in step S41), the BIOS determines whether the time during which no password has been input exceeds the time-out period (step S42). If the time during which no password has been input does not exceed the time-out period (NO in step S42), the BIOS returns to step S33.

If the time during which no password has been input exceeds the time-out period (YES in step S42), the BIOS transmits a power-off command to the EC/KBC 119 to turn off the computer 10 (step S43). The EC/KBC 119 functions as a power control module configured to turn off the computer 10, and the EC/KBC 119 turns off the computer 10 in response to reception of the power-off command.

By adding the function of automatically turning off the computer 10 when the time during which no password has been input exceeds the time-out period, the rise of heat can be prevented more reliably.

Although FIGS. 6 and 7 exemplify a case in which the authentication information is a BIOS password, the authentication information may be a token or fingerprint information mentioned above. Also, when the authentication information is a token or fingerprint information, BIOS password processing is executed according to the same sequence as that described with reference to FIG. 6 or 7.

As described above, according to the embodiment, processing of decreasing the operating speed of the CPU 111 is executed in response to determination that registered authentication information exists in the computer 10. Processing of increasing the operating speed of the CPU 111 is executed in response to confirmation of a match between input authentication information and the registered authentication information by authentication processing. This can suppress heat generation during a period before the operating system is booted. System performance necessary to execute the aforementioned authentication processing is much lower than system performance necessary for an operating system or application program to run. Even if the operating speed of the CPU 111 is decreased during the authentication processing and the authentication processing is executed at low system performance, the time taken for the authentication processing is hardly prolonged. Hence, heat generation and wasteful power consumption of the computer 10 can be efficiently suppressed without prolonging the time taken to start up the computer 10.

Note that the same effects as those of the embodiment can be easily implemented by storing the BIOS program of the embodiment in the flash BIOS-ROM of a general computer or the like via a computer-readable storage medium storing the BIOS password.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a processor;
   a non-volatile storage device configured to store a program for instructing the processor to execute when a basic input/output system (BIOS) is booted, (i) processing of, in response to power-on of the information processing apparatus, determining whether registered authentication information exists in the information processing apparatus, (ii) authentication processing of, when the registered authentication information exists in the information processing apparatus, comparing input authentication information with the registered authentication information and determining whether the input authentication information matches the registered authentication information, and (iii) processing of booting an operating system in response to confirmation of a match between the input authentication information and the registered authentication information by the authentication processing; and
   an operating speed controller configured to decrease an operating speed of the processor from a first operating speed to a second operating speed slower than the first operating speed in response to the determination that the registered authentication information exists in the information processing apparatus, and increase the operating speed of the processor to the first operating speed in response to the confirmation of the match between the input authentication information and the registered authentication information by the authentication processing before the operating system is booted.

2. The apparatus of claim 1, wherein when the registered authentication information does not exist in the information processing apparatus, the processing of booting the operating system starts without performing the authentication processing.

3. The apparatus of claim 1, further comprising a power controller configured to turn off the information processing apparatus when a time during which the input authentication information has not been inputted exceeds a first time.

4. The apparatus of claim 1, wherein the input authentication information includes one of a password, a token, and fingerprint information.

5. The apparatus of claim 1, wherein the program includes instructions for instructing the processor to execute a power-on self-test (POST) processing prior to the processing of determining whether the registered authentication information exists in the information processing apparatus.

6. The apparatus of claim 1, wherein when the registered authentication information exists in the information processing apparatus, the program instructs the processor to further execute processing of displaying, on a display, a message prompting a user to input the input authentication information.

7. The apparatus of claim 1, wherein the program includes the basic input/output system (BIOS).

8. A start-up control method comprising:
   determining, by using a processor, when a basic input/output system (BIOS) is booted, whether registered authentication information exists in an information processing apparatus, in response to power-on of the information processing apparatus;
   executing, by using the processor, authentication processing of comparing input authentication information with the registered authentication information and determining whether the input authentication information matches the registered authentication information, when the registered authentication information exists in the information processing apparatus;
   booting, by using the processor, an operating system in response to confirmation of a match between the input authentication information and the registered authentication information by the authentication processing;
   decreasing an operating speed of the processor from a first operating speed to a second operating speed slower than the first operating speed in response to the determination that the registered authentication information exists in the information processing apparatus; and
   increasing the operating speed of the processor to the first operating speed in response to the confirmation of the match between the input authentication information and the registered authentication information by the authentication processing before the operating system is booted.

9. A computer-readable, non-transitory storage medium configured to store a computer program which is executable by a computer, the computer program controlling the computer to execute functions of:
- determining when a basic input/output system (BIOS) is booted, whether registered authentication information exists in the computer, in response to power-on of the computer;
- executing authentication processing of comparing input authentication information with the registered authentication information and determining whether the input authentication information matches the registered authentication information, when the registered authentication information exists in the computer;
- booting an operating system in response to confirmation of a match between the input authentication information and the registered authentication information by the authentication processing;
- decreasing an operating speed of a processor in the computer from a first operating speed to a second operating speed slower than the first operating speed in response to the determination that the registered authentication information exists in the computer; and
- increasing the operating speed of the processor to the first operating speed in response to the confirmation of the match between the input authentication information and the registered authentication information by the authentication processing before the operating system is booted.

10. The apparatus of claim 1, wherein when the registered authentication information does not exist in the information processing apparatus, the operation speed of the processor is kept to the first operation speed.

11. The apparatus of claim 1, wherein an operation of the operating speed controller is controlled by the basic input/output system (BIOS).

12. The start-up control method of claim 8, wherein when the registered authentication information does not exist in the information processing apparatus, the operation speed of the processor is kept to the first operation speed.

13. The start-up control method of claim 8, wherein decreasing and increasing of the operation speed of the processor is controlled by the basic input/output system (BIOS).

14. The storage medium of claim 9, wherein when the registered authentication information does not exist in the computer, the operation speed of the processor is kept to the first operation speed.

15. The storage medium of claim 9, wherein decreasing and increasing of the operation speed of the processor is controlled by the basic input/output system (BIOS).

* * * * *